United States Patent [19]

Ferro

[11] Patent Number: 4,898,763

[45] Date of Patent: Feb. 6, 1990

[54] CURED POLYIMIDE FOAM STRUCTURES AND THEIR PRODUCTION

[75] Inventor: Gregory A. Ferro, Hoffman Estates, Ill.

[73] Assignee: Imi-Tech Corporation, Elk Grove Village, Ill.

[21] Appl. No.: 357,549

[22] Filed: May 26, 1989

Related U.S. Application Data

[63] Continuation of Ser. No. 261,114, Oct. 24, 1988, abandoned.

[51] Int. Cl.$^4$ .................... B32B 3/26; B32B 27/34
[52] U.S. Cl. .................... 428/159; 264/321; 428/317.1; 428/317.3; 428/473.5
[58] Field of Search ............ 264/109, 126, 236, 321; 428/159, 317.1, 317.3, 317.7, 473.5

[56] References Cited

U.S. PATENT DOCUMENTS

| | | | |
|---|---|---|---|
| 3,726,834 | 4/1973 | Acle, Jr. ........................... | 260/47 |
| 4,070,312 | 1/1978 | Gagliani et al. .................. | 260/2.5 |
| 4,319,000 | 3/1982 | Gagliani et al. .................. | 521/189 |
| 4,433,068 | 2/1984 | Long et al. ...................... | 521/54 |
| 4,562,112 | 12/1985 | Lee et al. ....................... | 264/321 |
| 4,576,862 | 3/1986 | Lee et al. ....................... | 428/317.7 |
| 4,639,343 | 1/1987 | Long et al. ..................... | 264/45.5 |
| 4,708,972 | 11/1987 | Long et al. ..................... | 521/185 |

Primary Examiner—William J. Van Balen
Attorney, Agent, or Firm—John F. Sieberth; Philip M. Pippenger

[57] ABSTRACT

A body of cured polyimide foam is treated with steam to produce a non-flexible, non-resilient cellular structure. A molding member is impressed into this structure to a depth less than the full thickness of the structure. The structure is then cured to polyimide foam with the molding member removed therefrom either before, during or after the curing has been completed. The resultant articles, which may be laminated, are useful as panels to dampen vibration and sound, and to provide thermal insulation. In addition the articles are flame resistant and flexible.

39 Claims, 2 Drawing Sheets

CURED POLYIMIDE FOAM STRUCTURES AND THEIR PRODUCTION

This is a continuation of Ser. No. 261,114, filed 10/24/88, now abandoned.

TECHNICAL FIELD

This invention relates to novel cellular structures composed of polyimide foam, to methods for the production of such structures, and to uses of such structures, such as in wall panels and the like.

BACKGROUND

Heretofore considerable work has been devoted to the production of various articles made from cured polyimide foam. Among applications considered have been flexible resilient foams for use as seat cushions, low density wall panels and high strength floor panels, thermal and acoustical insulation, laminated articles, and the like.

SUMMARY OF THE INVENTION

This invention provides a new type of structure based on polyimide foam which possesses all of the advantages of polyimide foam (e.g., enhanced strength, low density, and flame resistance, etc.). Such structures are readily produced by a novel process which converts a preformed cured polyimide foam into recurable foam having different properties from the preformed foam, converting this recurable foam into the desired structural shape and then curing the shape to form the desired structure. Such structures are useful for structural, vibration damping and thermal insulation applications.

As described in Application Ser. No. 240,802, filed Sept. 6, 1988, it has been discovered that by exposing cured polyimide foam to an atmosphere of steam under appropriate time-temperature-pressure conditions a non-flexible, non-resilient recurable cellular material is formed.

This invention involves, inter alia, the discovery of a novel method in which a cured polyimide foam is transformed into a body of non-flexible, non-resilient recurable cellular material, physically converted or shaped into a special configuration and then the cellular material is cured while in such configuration. In particular, this invention provides, inter alia, a process which comprises (i) converting cured polyimide foam into a body of non-flexible, non-resilient recurable cellular material by exposing a body of the foam to the action of steam, (ii) forming in the body of cellular material a plurality of spaced-apart laterally-disposed individual molded portions integral with and extending from a continuous portion of such cellular material, and (iii) heating the resultant unitary or integral body to cause the cellular material to cure.

In another of its embodiments this invention provides a process which comprises (i) exposing a body of cured polyimide foam to an atmosphere of steam at an elevated pressure for a period of time sufficient to convert said foam into a body of non-flexible, non-resilient recurable cellular material, (ii) impressing into the body of cellular material to a distance less than the full distance of the body of cellular material a molding structure defining a plurality of spaced-apart laterally-disposed open areas to form a unitary body of such cellular material having a plurality of spaced-apart individual portions of such cellular material generally conforming in shape and pattern to the shape and pattern of the open areas of the molding member, and (iii) heating such unitary body to cause the cellular material to cure. In conducting this operation, the molding structure may be left in the recurable foamy material as it is being cured or it may be removed from the foamy material at any stage before it is fully cured.

These and other embodiments of this invention will become still further apparent from the ensuing description, appended claims, and accompanying drawings.

FURTHER DESCRIPTION OF THE INVENTION

Figure 1:
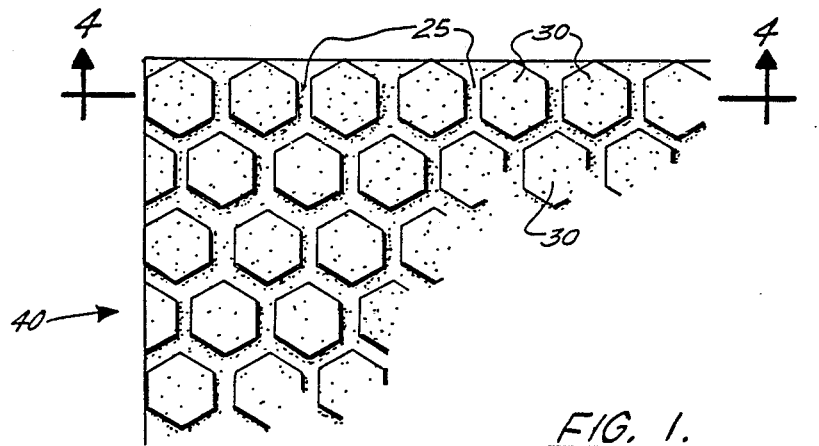
FIG. 1 depicts in fragmentary plan view a polyimide foam structure of this invention.

I. Formation of the Non-Flexible, Non-Resilient Recurable Cellular Material

In producing this recurable material, a body (e.g., a slab) of cured polyimide foam is converted by a hydrolytic steaming process under controlled temperature-pressure conditions into a body of recurable material which is malleable and pliable and easily cut or shaped. Yet it retains most of its original geometric configuration and cellular structure. Thus while in this non-resilient, non-flexible easily cut form it can be shaped by means of a cellular molding structure such as a honeycomb or the like. On heating the resultant shaped cellular structure to a suitable temperature the recurable foam returns to a cured resilient state.

The conditions used in the steam treatment are preferably such as to yield a recurable material that on recuring possesses at least tensile properties comparable to those of the original cured foam. However for some applications the recurable foamy material need not have this characteristic—it may be a material that is recurable to a cured foam having lower tensile properties than the initial cured foam.

In many cases a convenient way of gauging the extent of the pressurized steam hydrolysis of the initial polyimide foam is to monitor the progress of this reaction by means of differential scanning calorimetry. For example, as the pressured steaming operation is being conducted, samples of the foam may be examined by means of a differential scanning calorimeter such as a Mettler TA-3000 System with a TC 10A Processor.

In general, the non-resilient, non-flexible foam formed in the steam treatment will, at least when using foams of the type described in the Examples hereinafter, have a consistency somewhat like lightly packed snow.

In conducting the pressurized steam hydrolysis, it is convenient to subject the initial polyimide foam to the action of steam in a closed system such as an autoclave. The time-temperature-pressure conditions may vary from one type of foamed polyimide polymer to another. With polyimide foams of the type described in the Examples hereinafter, temperatures in the range of about 260° to about 274° C. (pressures in the range of about 680 to about 849) psia will ordinarily be employed. The time periods used will of course depend on the temperature and pressure used, and the properties desired in the resultant non-flexible, non-resilient foamed material to be produced therefrom. Thus for a given cured polyimide foam, the higher the temperature and pressure, the shorter may be the steam treatment time. And, if it is desired to produce a non-flexible, non-resilient foamed material that can be cured to a polyimide foam having tensile strength properties comparable to those of the initial foam, the time of exposure to a given set of steam temperature-pressure conditions will be shorter than if it is desired to form a recurable non-flexible, non-resilient foamed material that can be recured to a polyimide foam which does not have tensile strength properties generally as good as those of the initial cured polyimide foam.

If desired, the steam to which the initial cured polyimide foam is exposed may be diluted with other gaseous or vaporous materials, such as air, nitrogen, argon, neon, methanol, or the like.

II. Formation of the Shaped Cellular Structures

Figure 2:
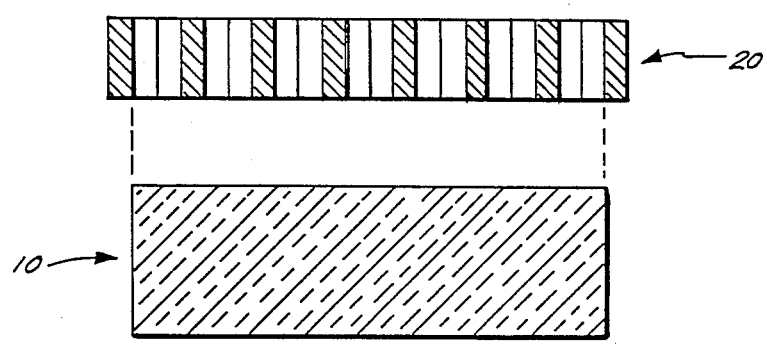
FIGS. 2 and 3 illustrate in sectional elevation one method by which structures of this invention may be produced pursuant to this invention.
Figure 3:
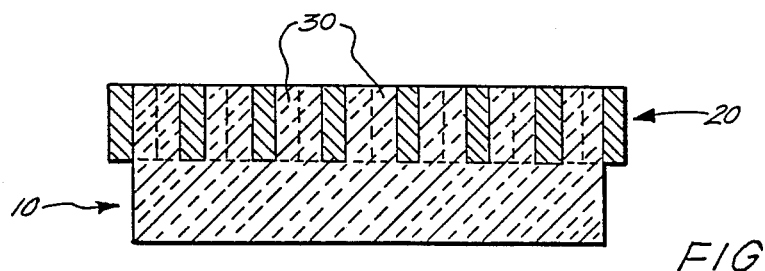
Figure 4:
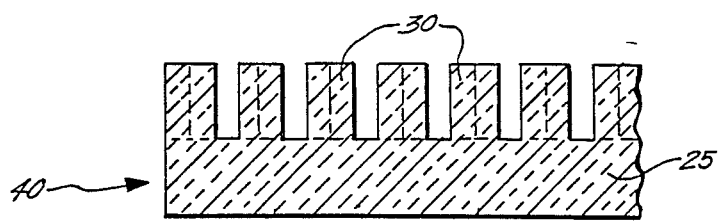
FIG. 4 illustrates in sectional elevation taken along line 4,4 of FIG. 1 a polyimide foam structure of this invention.
Figure 5:
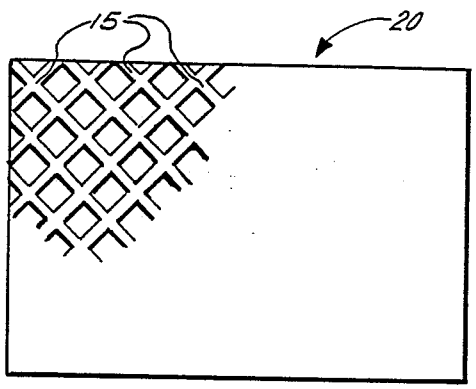
FIG. 5 depicts in fragmentary plan view an alternative form of molding member that may be used in forming the shaped cellular articles of this invention.

Referring now to the Drawings, FIGS. 2 and 3 illustrate one preferred way by which the non-flexible, non-resilient recurable cellular material may be shaped. In this operation a body 10 (e.g., a slab) of recurable cellular material and a molding member 20 such as a honeycomb are aligned with each other and brought together so that structure 20 is impressed into body 10. The precise way in which this is accomplished is not critical and various ways may be used, such as by pressing structure 20 into stationary body 10, or body 10 into stationary structure 20, or by concurrently moving body 10 and structure 20 against each other. In any case structure 20 cuts into the recurable cellular material of body 10 to whatever depth may be desired while leaving at least part of the lower portion of body 10 intact. Thereupon the resultant structure is heated to a curing temperature, for example in an oven. Before, during or after this curing operation, molding member 20 may be withdrawn from body 10. If the shape and materials of construction of the molding member are such that it would become tightly bonded to the cured cellular material, it is desirable to remove the molding member before or during the early stages of the curing operation. As indicated in FIGS. 1 and 4, these operations result in the formation of structures of this invention 40 which the integral body of cured polyimide foam has a plurality of spaced apart laterally-disposed individual molded portions 30 extending from a continuous portion 25 of the cured polyimide foam 25.

Figure 6:
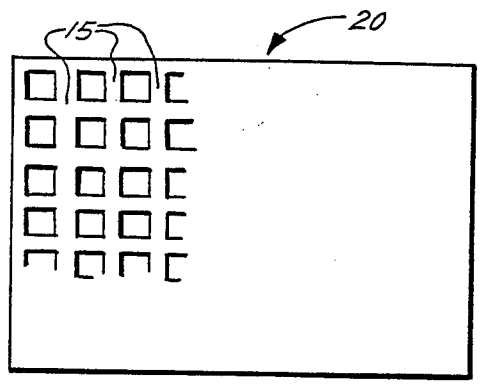
FIG. 6 depicts in fragmentary plan view another alternative form of molding member that may be used in forming the shaped cellular articles of this invention.
Figure 7:
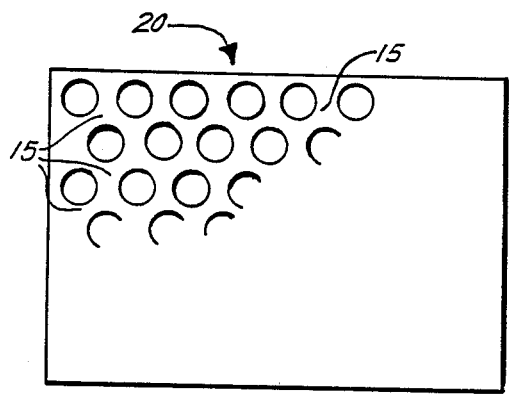
FIG. 7 depicts in fragmentary plan view yet another alternative form of molding member that may be used in forming the shaped cellular articles of this invention.
Figure 8:
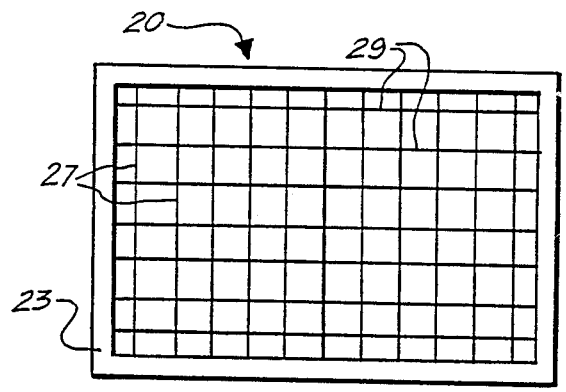
FIG. 8 depicts in plan view still another alternative form of molding member that may be used in forming the shaped cellular articles of this invention.

FIGS. 5, 6, 7 and 8 indicate that the configuration of molding member 20 can vary widely. For example in FIG. 5 the interior walls 15 of molding member 20 define a diamond shaped pattern of cells. In FIG. 6, molding member 20 has a rectangular or square pattern of cells whereas in FIG. 7 a pattern of adjacent offset circular cells is defined by the interior walls 15 of molding member 20. In FIG. 8, molding member 20 consists of a frame 23 across which are stretched a plurality of thin wires 27, 29. In the form depicted, these wires are stretched tightly at right angles to each other thereby forming a series of laterally adjacent rectangular spaces. Wires 27, 29 may be interwoven as in a screen or one set may be superposed one set above the other. Other configurations for the molding members are possible and permissible.

The materials from which the molding member 20 itself may be formed can be widely varied to suit the needs of the occasion. Thus molding member 20 may be composed of metals, polymers and plastics (e.g., polyimide, fluoropolymers such as Teflon polymer, polybenzimidazole, polypropylene, etc.), resin coated or impregnated paper or cardboard, fiber composites, and the like. The size of the individual cells within the molding member and the thickness of the walls separating such cells can range from large to small—this is primarily a matter of choice to be governed by such factors as intended use of the resultant product, cost, and availability of materials. It will be appreciated however that the walls of the molding member should not be so thick as to completely crush the cellular material within and below the cells so that the material within and below the cells no longer has any cellular structure whatever.

III. Typical Structures of the Invention

Figure 9:
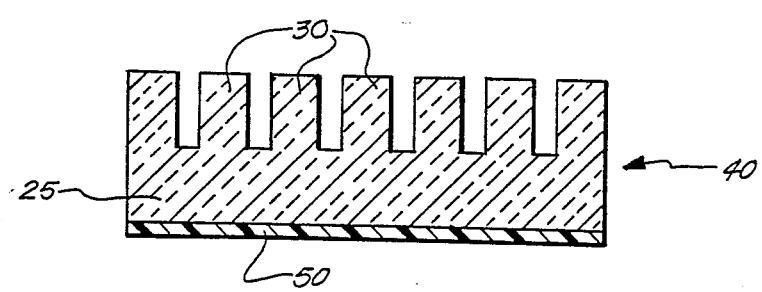
FIG. 9 depicts in sectional elevation a laminated polyimide foam structure of this invention.

FIG. 1 depicts one preferred form of the structures of this invention. It will be seen from FIG. 1 that the structure is composed of an integral body referred to generally as 40 comprising a lower continuous portion 25 from which a plurality of laterally disposed individual molded portions 30 extend in an upward direction from portion 25. The entire structure may thus be composed of cured polyimide foam (as depicted in FIG. 1). Alternatively, and, as indicated by FIG. 9, the cured polyimide structure of this invention may be modified by applying one or more laminates 50 to the continuous portion 25 of the structure. Such laminates are preferably applied to the side of the body opposite the spaced apart laterally disposed individual molded portions 30 integral therewith.

It will be apparent that the shape and depth of the individual molded portions 30 may be varied. Thus, in FIG. 1 these portions are hexagonal in shape. Use of the molding members of FIGS. 5, 6 and 7 would produce a diamond shaped pattern of individual molded portions, a rectangular pattern of square individual molded portions, and an offset pattern of circular individual molded portions, respectively. Use of the molding member of FIG. 8 would produce a member of similar character to that resulting from use of molding member of FIG. 6 with the exception that the distance between adjacent individual molded portions would be much smaller that in the case of molding member of FIG. 8. The walls of the molded portions 30 may be stepped, tapered, vertically ribbed, etc.

When producing a laminated structure of this invention, a wide selection of laminating materials are available for use. Suitable laminating materials include sheets, plies, boards, films, foils or other suitable generally flat forms of metal, plastics, fiber-reinforced composite materials, reinforced ceramic composites, resin-coated fibrous materials, paper or paperboard, particle board, rubbers and elastomers, and many other similar materials. Laminating material 50 may be applied before, during or after the curing operation. Suitable adhesives may be used in order to secure or assist in securing laminating material 50 to the structure. In some cases an adhesive may not be necessary, as when the laminating material 50 is applied tightly against the body of shaped cellular material before curing is effected whereby the cured polyimide serves as an adhesive. However ordinarily it is convenient and desirable to employ an adhesive to insure tight bonding between the parts. The types and identities of adhesives suitable for this use are so well known to those skilled in the art as to require no further explanation. See for example *Kirk-Othmer, Encyclopedia of Chemical Technology*, Copyright 1978 by John Wiley & Sons, Inc., Wiley-Interscience, Third Edition, Volume 1, pages 488–510 and references cited therein; and *Encyclopedia of Polymer Science and Technology*, Copyright 1964 by John Wiley & Sons, Inc., Interscience, Volume 1, pages 445–550 and references cited therein.

Laminating material 50 may also be in the form of tapes or sheets having adhesive on either or both sides.

The composition of the tape or sheet and adhesive will of course be dependent on the use for which the resultant composite article is intended. A wide variety of commercially-available tapes are suitable for making such composite articles. Some of these materials are described, for example, in product brochures such as "Scotch 3M Industrial Tapes and Related Products" (No. 70-0701-06748(151) DPI) and "Scotch 3M Specialty Tapes and Related Products" (No. 70-0701-5000-1), (both available from the 3M Company) or equivalent brochures, and "temp-r-tape/electrical-mechanical" (No. TRT-4-2/83), or equivalent brochure (available from CHR Industries, Inc.).

It will of course be recognized that multilayered structures or panels may be used as laminating material 50. The possibilities are thus virtually limitless.

Having described the basic concepts of the invention, reference is now made to the following examples which are provided by way of illustration, but not by way of limitation of the practice of the invention.

Examples I through III illustrate methods of forming the non-flexible, non-resilient recurable cellular material, and also illustrate how such material may be cured.

EXAMPLE I

The samples used in these runs were based on cured polyimide foams made from a lower alkyl ester of benzophenone tetracarboxylic acid (predominantly di-methyl ester), 4,4'-methylenedianiline and 2,6-diaminopyridine in a mol ratio of about 1.0:0.7:0.3, respectively. Six such samples were placed in a sealed autoclave and subjected to steam at 270° F. (about 132° C.) for 4 hours. After each hour, the glass transition temperature (Tg) of the foam was determined by differential scanning calorimetry with a Mettler TA-3000 System with a TC 10A Processor, using the 50% Tg values reported by the system. After the third hour, and again at the end of the fourth hour, separate portions of these six foams were removed from the autoclave and recured in a thermal oven at 525° F. (about 274° C.) for 45 minutes. The tensile properties of the resultant cured foams were then determined by ASTM test procedure D-3574 using an Instrom model 1122 universal tester with a 50-pound load cell.

Table 1 shows the Tg values for the initial polyimide foam samples, the Tg values of these materials after 1, 2, 3, and 4 hours of exposure to the pressurized steam, and the Tg values of the foams that were recured after 3 and 4 hours of steam exposure, respectively. The results of the tensile strength measurements are shown in Table 2.

TABLE 1

| Sample | Glass Transition Temperatures, °C. | | | | |
|---|---|---|---|---|---|
| | Before Autoclave | Autoclave 1 Hour | Autoclave 2 Hours | Autoclave 3 Hours | Autoclave 4 Hours |
| 1 | 268.9 | 264.0 | 260.9 | 258.8 | 260.1 |
| 2 | 273.4 | 267.5 | 262.8 | 262.4 | 256.2 |
| 3 | 273.0 | 265.2 | 261.7 | 260.6 | 260.1 |
| 4 | 270.3 | 268.4 | 268.1 | 262.2 | 260.0 |
| 5 | 269.3 | 265.4 | 265.3 | 265.0 | 253.7 |
| 6 | 272.8 | 266.6 | 263.4 | 262.9 | 255.3 |
| | | | | Recured | Recured |
| 1 | | | | 286.7 | 286.3 |
| 2 | | | | 286.1 | 283.6 |
| 3 | | | | 286.5 | 285.5 |
| 4 | | | | 286.3 | 285.6 |
| 5 | | | | 284.9 | 287.4 |
| 6 | | | | 286.7 | 284.9 |

TABLE 2

| | Tensile Strenth, (psi) | |
|---|---|---|
| Sample | Recured After 3 Hours Autoclave | Recured After 4 Hours Autoclave |
| 1 | 11.7 | 8.4 |
| 2 | 11.7 | 11.5 |
| 3 | 12.3 | 10.4 |
| 4 | 12.1 | <1.0 |
| 5 | 12.6 | 7.7 |
| 6 | 11.5 | <1.0 |

The data in Table 2 indicate that under the conditions used, all six recured- samples that had been steam treated for 3 hours exhibited tensile strength properties similar to the tensile strength properties of the original cured polyimide foams. On the other hand, although all of the six samples that had been steamed treated for 4 hours were recurable, only recured Samples 2 and 3 retained tensile properties similar to the initial foams from which they were formed. Recured Samples 1 and 5 had lower tensile strengths and the tensile strengths of Samples 4 and 6 were very low.

EXAMPLE II

A series of runs were conducted generally as in Example I except that the samples were exposed to pressurized steam in the autoclave for a total of 6 hours, and tensile strength measurements were made on all samples. The initial cured polyimide foam had a Tg of 275.36° C. and a tensile strength of 9.08+0.40 psi. When this foam was subjected to the recuring conditions (without having been exposed to steam) it had a Tg of 280.43° C. and a tensile strength of 8.91+1.07 psi. The results of the runs involving use of the steam treatment are summarized in Table 3.

TABLE 3

| Sample | Glass Transition Temperatures, °C. | | Tensile Strength, psi | |
|---|---|---|---|---|
| | Initial | After Autclave | After Recuring | After Autoclave | After Recuring |
| 1 Hr. | 275.19 | 271.95 | 284.80 | 9.84 + 1.66 | 10.16 + 1.55 |
| 2 Hrs. | 276.33 | 268.24 | 280.74 | 7.26 + 1.35 | 8.88 + 0.64 |
| 3 Hrs. | 274.92 | 265.20 | 277.81 | 6.13 + 1.02 | 7.23 + 0.61 |
| 4 Hrs. | 274.15 | 261.86 | 280.36 | <1.0 | 9.15 + 0.55 |
| 5 Hrs. | 279.40 | 263.27 | 281.29 | <1.0 | 11.09 + 0.80 |
| 6 Hrs. | 276.04 | 273.66 | 286.46 | <1.0 | <1.0 |

EXAMPLE III

Using the general procedure of Example II, six samples (12"×6"×0.5"in size) of the cured polyimide foam were subjected to pressurized steam in the autoclave. After specified times of steam-treatment, the samples together with a control sample (not steam treated) were subjected to recuring conditions, and Tg and tensile strength measures were made on all samples. Tables 4 and 5 summarize the results so obtained.

TABLE 4

| | Glass Transition Temperatures, °C. | | | | | | |
|---|---|---|---|---|---|---|---|
| | Before Autoclave | After Autoclave | | | | | |
| | | 1 Hr. | 2 Hrs. | 3 Hrs. | 4 Hrs. | 5 Hrs. | 6 Hrs. |
| Control | 275.4 | | | | | | |
| 1 | 275.2 | 271.9 | | | | | |
| 2 | 276.3 | | 268.2 | | | | |
| 3 | 274.9 | | | 265.2 | | | |
| 4 | 274.2 | | | | 261.9 | | |
| 5 | 279.4 | | | | | 263.3 | |
| 6 | 276.0 | | | | | | 273.7 |

| | After Thermal Recure | | | | | |
|---|---|---|---|---|---|---|
| | 1 Hr. | 2 Hrs. | 3 Hrs. | 4 Hrs. | 5 Hrs. | 6 Hrs. |
| Control 280.4 | | | | | | |
| 1 | 284.8 | | | | | |
| 2 | | 280.7 | | | | |
| 3 | | | 277.8 | | | |
| 4 | | | | 280.4 | | |
| 5 | | | | | 281.3 | |
| 6 | | | | | | 286.5 |

TABLE 5

| | Tensile Strength, (psi) | | | | | | |
|---|---|---|---|---|---|---|---|
| Sample | Before Autoclave | After Autoclave | | | | | |
| | | 1 Hr. | 2 Hrs. | 3 Hrs. | 4 Hrs. | 5 Hrs. | 6 Hrs. |
| Control | 9.1 | | | | | | |
| 1 | | 9.8 | | | | | |
| 2 | | | 7.3 | | | | |
| 3 | | | | 6.2 | | | |
| 4 | | | | | <1.0 | | |
| 5 | | | | | | <1.0 | |
| 6 | | | | | | | <1.0 |

| | After Thermal Recuring | | | | | |
|---|---|---|---|---|---|---|
| | 1 Hr. | 2 Hrs. | 3 Hrs. | 4 Hrs. | 5 Hrs. | 6 Hrs. |
| Control 9.0 | | | | | | |
| 1 | 10.2 | | | | | |
| 2 | | 8.9 | | | | |
| 3 | | | 7.2 | | | |
| 4 | | | | 9.2 | | |
| 5 | | | | | 11.1 | |
| 6 | | | | | | <1.0 |

Examples IV and V illustrate the production and properties of cellular structures of this invention.

EXAMPLE IV

A slab 0.87 inch in thickness of cured polyimide foam of the type described in Example I was treated with steam in an autoclave at about 132° C. for 3 to 4 hours. A commercially-available honeycomb approximately 0.36 inch in thickness made from paperboard coated with a phenolic resin was impressed into the resultant slab of recurable non-flexible, non-resilient recurable cellular material to a depth of 0.37 inch to fill the cells of the honeycomb therewith. This left the bottom 0.5 inch thickness of the cellular material intact and uncut. The major axis (apex to opposite apex) across the individual honeycomb cells was about 0.15 inch and the minor axis (sidewall to opposite sidewall) was about 0.10 inch. The resultant article with the honeycomb in place was heated in a thermal oven at about 274° C. for about one hour to recure the foam into polyimide foam. After cooling to room temperature the honeycomb was removed leaving an integral body of cured polyimide foam having a plurality of spaced-apart laterally-proximate individual portions of cured polyimide foam approximately 0.37 inch in length integral with and extending from said base portion. The finished article had a density of 0.56 pounds per cubic foot and an areal density of 0.47 pound per square foot. It exhibited considerable flexibility and resiliency. For example, it could be bent repeatedly 90° around a right angle corner of a wall. It was flame resistant.

EXAMPLE V

Using the same general procedure as in Example IV, a similar article was produced from a 1.5 inch thick slab of the same kind of cured polyimide foam and a 1.0 inch thick a phenolic resin coated paperboard honeycomb (major axis: ca. 0.23 inch; minor axis: ca. 0.2 inch). In this case the honeycomb was impressed in the steam-treated slab to a depth of one inch leaving the lower 0.5 inch portion of the slab intact and uncut. After curing and removal of the honeycomb, the unitary article of this invention had a density of 0.49 pound per square foot and an areal density of 0.41 pound per square foot. It had a plurality of individual hexagonally shaped projections of polyimide foam one inch long extending from a one-half inch base of polyimide foam integral therewith. The article was flexible, resilient and flame resistant.

Laminates of this invention suitable for use as sound and vibration damping self-adhesive panels can be formed by applying to the underside of a cured, shaped polyimide foam article (such as those of Examples IV and V) a tape or sheet coated with adhesive on both sides (e.g., a Kapton ® polyimide tape having a silicone adhesive on both sides available from CHR Industries as temp-r-tape ® product number K-100). Alternatively the panels, whether laminated or unlaminated, may be installed by conventional fasteners such as nails, screws, or the like. Such panels have thermal insulative and flame resistant properties as well.

IV. Formation of the Initial Polyimide Foams

The initial cured polyimide foams used in the practice of this invention can vary widely in composition. In general, they are produced from polyimide precursors composed of a mixture comprising at least (i) one or more organic tetracarboxylic acids or derivatives thereof, and (ii) one or more organic diamines co-reactive therewith, preferably including at least an aromatic or heterocyclic primary diamine. Components (i) and (ii) are usually present in the mixture in essentially stoichiometric quantities.

The organic tetracarboxylic acids or derivatives thereof are preferably based on aromatic tetracarboxylic acids having the general formula:

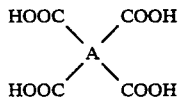

wherein A is a tetravalent organic group preferably an aromatic group. The tetravalent organic group A is most preferably an aromatic group having one of the following structures:

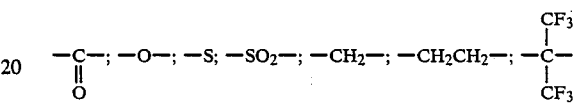

wherein X is one or more of the following:

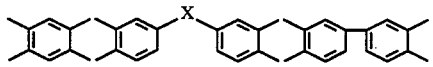

although other aromatic groups are suitable. The derivatives which may be employed include acid halides, acid salts, esters, and the like. Of these, esters are preferred and are most generally used for foam production.

The derivatives which may be employed include acid halides, acid salts, esters, and the like. Of these, esters are preferred and are most generally used for foam production.

Preferred among the tetracarboxylic acid esters are the alkyl esters of 3,3',4,4'-benzophenone tetracarboxylic acid, most preferably the lower alkyl diesters thereof. Mixtures of two or more aromatic esters, most preferably predominating in diesters, may be employed, if desired.

It is also possible, in accordance with this invention, that the tetracarboxylic acid derivative employed in the manufacture of the polyimide foams be a caprolactam as taught by U.S. Pat. No. 4,161,477, 4,183,838 and 4,183,839, the disclosures of which are incorporated herein by reference. As described in those patents, bis-imide is formed by reaction of a tetracarboxylic acid dianhydride with an oxoimine such as caprolactam and then reacted with the diamine or diamines to produce the desired polyimides. The caprolactam is displaced during the reaction, in much the same way as is the ester portion of the tetracarboxylic acid ester.

The tetracarboxylic acid derivative used in the manufacture of the initial polyimide foams employed in the practice of this invention may also be an N-substituted imido acid ester of the tetracarboxylic acid as taught by U.S. Pat. No. 4,647,597 and 4,656,198, the disclosures of which are incorporated herein by reference. As described in those patents, the N-substituted imido acid ester may be formed by reacting an aromatic tetracarboxylic acid dianhydride with an amino acid and an alcohol or mixture of alcohols. As further taught in those patents, on reaction of the imido acid ester with the diamine or diamines, the acid ester group bonded to the nitrogen atom of the N-substituted imido acid ester is displaced so that the desired polyimide is formed.

The organic diamines with which the foregoing mixture of tetracarboxylic acids or derivatives is employed may be represented by the formula:

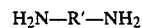

wherein R' is an aromatic group containing 5 to 16 carbon atoms and containing up to one hetero atom in the ring, the hetero atom being nitrogen, oxygen or sulfur. Also included are aromatic groups such as:

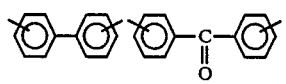

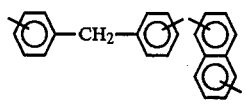

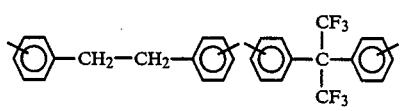

Representatives of such diamines include:
2,6-diaminopyridine;
3,5-diaminopyridine;
3,3'-diaminodiphenylsulfone;
4,4'-diaminodiphenylsulfone;
4,4'-diaminodiphenylsulfide;
3,3'-diaminodiphenylether;
4,4'-diaminodiphenylether;
meta-phenylenediamine;
para-phenylenediamine;
4,4'-methylene dianiline;
2,6-diamino toluene;
2,4-diamino toluene;
and the like.

It is also possible and sometimes desirable in the preparation of the polyimide precursors, to include in the reaction mixture one or more aliphatic diamines. Such aliphatic diamines are preferably alpha-omega diaminoalkanes having the formula:

$$H_2N-(CH_2)_n-NH_2 \qquad (I)$$

wherein n is an integer from 2 to 16. Representatives of such diamines include 1,3-diaminopropane, 1,4-diaminobutane, 1,5-diaminopentane, 1,6-diaminohexane, etc.

In place of or in addition to the foregoing aliphatic amines, use can be made of aliphatic etherified polyamines of the type polyoxypropylene amines having the formula:

$$H_2N-CH(CH_3)CH_2-[OCH_2CH(CH_3)]_x-NH_2 \qquad (II)$$

wherein x varies from 1 to about 5 carbon atoms.

Other useful primary diamines which may be included in the foams used in the practice of this invention include amino-terminated butadiene-nitrile copolymers having the general formula:

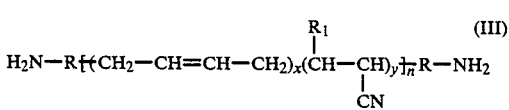

wherein R is either a phenylene group or an alkylene group, $R_1$ is hydrogen or methyl, and x and y or each independently integers ranging from 1 to 25 and n is an integer, preferably below 20. In these copolymers it is preferred that butadiene constitute at least 50% by weight of the butadiene and nitrile monomer. The nitrile monomer copolymerized with the butadiene can either be acrylonitrile or methacrylonitrile. Such copolymers generally have low molecular weights, preferably less than 3,000 to insure that they are sufficiently fluid to react in the formation of the polyimide as well as sufficiently fluid so as to be capable of foaming.

Still another type of primary diamines which may be included in the polyimide foams used in this invention is the aromatic amino-terminated silicones, such as those having the general formula:

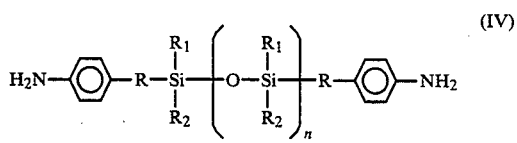

wherein R is a $C_2$ to $C_6$ alkylene group, $R_1$ and $R_2$ are each independently lower alkyl containing 1 to 3 carbon atoms and n is an integer from 1 to 4.

Another preferred category of diamines which may be utilized in forming the foams for use in this invention are the diesters of an amino-substituted aromatic carboxylic acid and a polymethylene glycol. Such diesters may be represented by the general formula:

$$H_2N-ArCOO-R-OOCAr-NH_2 \qquad (V)$$

wherein R is an alkylene group (which may be branched or straight chain) and which preferably contains from 3 to 8 carbon atoms, most preferably trimethylene; and Ar is an aromatic group which may be composed of one or more fused or non-fused benzene rings which in turn may carry suitable substituents (e.g., nitro, alkoxy, etc.) in addition to the primary amino groups.

A few exemplary diesters of this type include:
ethylene glycol-4-aminobenzoic acid diester;
ethylene glycol-3-aminobenzoic acid diester;
ethylene glycol-2-aminobenzoic acid diester;
trimethylene glycol-3-aminobenzoic acid diester;
trimethylene glycol-2-aminobenzoic acid diester;
trimethylene glycol-3-amino-2-nitrobenzoic acid diester;
tetramethylene glycol-3-amino-4-nitrobenzoic acid diester;
tetramethylene glycol-3-amino-5-nitrobenzoic acid diester;
tetramethylene glycol-4-amino-2-nitrobenzoic acid diester;
1,5-pentanediol-4-amino-3-nitrobenzoic acid diester;
1,6-hexanediol-5-amino-2-nitrobenzoic acid diester;
neopentyl glycol-4-amino-2-methylbenzoic acid diester;
1,8-octanediol-4-amino-2-propylbenzoic acid diester;
1,9-nonanediol-3-amino-4-methylbenzoic acid diester;
1,10-decanediol-4-(4-aminophenyl)benzoic acid diester;
and the like. Mixtures of such diesters may be employed.

A particularly preferred diester of this type is the diester of trimethylene glycol (1,3-propanediol) and 4-aminobenzoic acid.

In producing the initial polyimide foams, the organic tetracarboxylic acid preferably in the form of its diester, most preferably from methanol or ethanol, is reacted with the above-referred-to amine(s) to form a prepolymer in the form of a consolidated, fragile foam structure, which is then subjected to additional heating in order to effect imide formation and thereby cure the polymer. When using the tetracarboxylic acid ester this operation can be conducted either in the presence or absence of an added blowing agent to provide the desired polyimide foam.

The relative proportions used in the preparation of the polyimide and polymers can be varied. In general, it is preferred to employ essentially stoichiometric proportions as between the mixture of tetracarboxylic acids or derivatives thereof and the primary diamine(s). However, non-stoichiometric mixtures can be used although the excess of the reactant present in excess usually does not participate in the reaction.

When using a lower alkyl ester of the tetracarboxylic acid, the resulting alcohol produced in the reaction as well as the water released during the reaction can be used as the blowing agent during polymerization to form the desired polyimide foams. Alternatively, use can be made of any of a variety of organic or inorganic blowing agents. By use of a solid blowing agent such as Celogen TSH, Celogen OT, Celogen AZ 130, Celogen RA, Celogen HT 500, Celogen HT 550, sodium bicarbonate, benzenesulfonyl hydrazide, boric acid, benzoic acid, and Expandex 5 PT of controlled particle size, the homogeneity of the cellular structure of the resulting polyimide foam can be more accurately controlled. Preferred for such use are solid blowing agents which have been subjected to ball milling or other grinding so that the blowing agent is less than 200 microns in diameter, with 98 percent of the blowing agent particle sizes being less than 150 microns in diameter.

The chemical compositions of the blowing agents identified by trade name above follow:

| Blowing Agent | Chemical Composition |
|---|---|
| Celogen TSH | toluenesulfonyl hydrazide |
| Celogen OT | p,p'-oxybis(benzenesulfonyl hydrazide) |
| Celogen AZ 130 | azodicarbonamide |
| Celogen RA | p-toluenesulfonyl semicarbazide |
| Celogen HT 500 | a modified hydrazine derivative |
| Celogen HT 550 | hydrazol dicarboxylate |
| Expandex 5 PT | 5-phenyltetrazole |

Variations in the concentration of the blowing agent can be used to achieve specific densities and ILD values. Concentrations of up to 10 percent based on the weight of the polyimide precursor, and preferably 1 to 5 percent, can be employed. A concentration of about 2.5 weight percent is particularly preferred.

Hydrated organic compounds of the type referred to in U.S. Pat. No. 4,621,015 may also be used as blowing agents in forming polyimide foams suitable for use in the practice of this invention.

The initial foams may contain various filler and/or reinforcing materials. For example, graphite, glass and other synthetic fibers can be added to the precursor composition to produce a fiber-reinforced product. Microballons may be added for density adjustment, if desired. It is frequently desirable to employ a surfactant thereby increasing cellular structure stability and uniformity, and increase fatigue resistance and make the foam more flexible and resilient. The nature of such surfactants for this use is well known and reported in the patent literature.

When producing foams from tetracarboxylic acids or derivatives thereof other than lower alkyl esters, a blowing agent and/or microballons should be employed in order to achieve a suitable cellular structure.

Although not necessary, for some applications it is desirable that the initial foam contain a suitable quantity of a flame retardant material in order to still further increase the flame resistance of the foam.

In preparing the polyimide precursors, it is preferred to employ the procedures and spray drying techniques described in U.S. Pat. No. 4,296,208, the disclosure of which is incorporated herein by reference.

The temperatures at which the precursor is converted to the polyimide foam are generally those temperatures used in the preparation of other polyimide polymers. As a general rule temperatures ranging from 200° to 400° C. can be used, with heating times from 5 to 60 minutes or longer. As those skilled in the art will appreciate, the time for carrying out the reaction is somewhat dependent upon the reaction temperature, higher temperatures enabling the use of shorter reaction times. It is also possible to heat to a lower temperature in the first stage of the reaction and then to higher temperatures in the later stages.

Heating can be carried out in a conventional oven if desired. Alternatively, the foaming and curing of the precursor into a foamed polyimide polymer can be effected by means of microwave heating. In this technique, the precursor is exposed for 1 to 120 minutes to radio frequencies within the range of 915 to 2450 MHz, with the power output ranging from 1 to 100 kw. The power output to prepolymer weight ratio generally falls within the range of 0.1 to 10 kw per kg.

The specific details concerning the production of polyimide foams have been extensively described in the literature and foams suitable for use in the practice of this invention are available as articles of commerce (Solimide ® Foam). In practicing this invention, all that is required is that the initial cured polyimide foam be convertible to a non-flexible, non-resilient recurable cellular material when subjected to steam treatment under appropriate conditions of time, temperature and pressure.

V. Uses of the Cured Cellular Structures and Laminates Thereof

The flame and fire resistance of the foams of the cured cellular structures of this invention together with their relatively low smoke output when exposed to fire render them ideally suited for use as decorative construction and/or insulation materials for aircraft and spacecraft, houses and buildings of all types, automobiles and trucks, boats and ships, submarines, and the like. The laminated structures are particularly useful as wall and ceiling panel structural members especially when the laminate(s) used have an exterior adhesive surface and are themselves composed of flame resistant or non-combustible material(s). Such articles can readily be applied to wall and ceiling surfaces, as flame resistant and serve to dampen sound and other types of vibration. Enhancing all such utilities are the relatively low densities and high strengths in which the structures of this invention may be provided.

It will be apparent that this invention is susceptible to considerable variation in the practice without departing from the spirit and scope of the appended claims, the forms described hereinbefore being merely exemplary of its practice.

What is claimed:

1. A process which comprises (i) converting cured polyimide foam into a body of non-flexible, non-resilient recurable cellular material by exposing a body of the foam to the action of steam, (ii) forming in the body of cellular material a plurality of spaced-apart laterally-disposed individual molded portions integral with and extending from a continuous portion of such cellular material, and (iii) heating the resultant unitary body to cause the cellular material to cure.

2. A process according to claim 1 wherein said cured polyimide foam is composed of a polyimide of at least one aromatic tetracarboxylic acid or derivative thereof and at least one aromatic or heterocyclic primary diamine.

3. A process according to claim 1 wherein said cured polyimide foam is composed of a polyimide of benzophenone tetracarboxylic acid or derivative thereof, 4,4'-methylenedianiline and at least one diaminopyridine.

4. A process according to claim 1 wherein said cured polyimide foam is composed of a polyimide produced from a lower alkyl ester of benzophenone tetracarboxylic acid, 4,4'-methylenedianiline and 2,6-diaminopyridine in a mole ratio of approximately 1:0.7:0.3, respectively.

5. A process according to claim 1 conducted such that said cellular material is recurable to a flexible, resilient foam having tensile strength properties similar to the tensile strength properties of the original cured polyimide foam subjected to the process.

6. A process according to claim 1 conducted such that the glass transition temperature of the original cured polyimide as determined by differential scanning calorimetry is reduced to a glass transition temperature falling within a predetermined range of glass transition temperatures for said original cured polyimide, and is thereupon discontinued.

7. A process which comprises (i) exposing a body of cured polyimide foam to an atmosphere of steam at an elevated pressure for a period of time sufficient to convert said foam into a body of non-flexible, non-resilient recurable cellular material, (ii) impressing into the body of cellular material to a distance less than the full distance of the body of cellular material a molding structure defining a plurality of spaced-apart laterally-disposed open areas to form an integral body of such cellular material having a plurality of spaced-apart individual portions of such cellular material generally conforming in shape and pattern to the shape and pattern of the open areas of the molding member, and (iii) heating such integral body to cause the cellular material to cure.

8. A process according to claim 7 wherein said cured polyimide foam is composed of a polyimide of at least one aromatic tetracarboxylic acid or derivative thereof and at least one aromatic or heterocyclic primary diamine.

9. A process according to claim 7 wherein said cured polyimide foam is composed of a polyimide of benzophenone tetracarboxylic acid or derivative thereof, 4,4'-methylenedianiline and at least one diaminopyridine.

10. A process according to claim 7 wherein said cured polyimide foam is composed of a polyimide produced from a lower alkyl ester of benzophenone tetracarboxylic acid, 4,4'-methylenedianiline and 2,6-diaminopyridine in a mole ratio of approximately 1:0.7:0.3, respectively.

11. A process according to claim 7 conducted such that said cellular material is recurable to a flexible, resilient foam having tensile strength properties similar to the tensile strength properties of the original cured polyimide foam subjected to the process.

12. A process according to claim 7 conducted such that the glass transition temperature of the original cured polyimide as determined by differential scanning calorimetry is reduced to a glass transition temperature falling within a predetermined range of glass transition temperatures for said original cured polyimide, and is thereupon discontinued.

13. A process which comprises (i) exposing a body of cured polyimide foam to an atmosphere of steam at an elevated pressure for a period of time sufficient to convert said foam into a body of non-flexible, non-resilient recurable cellular material, (ii) impressing into the body of cellular material to a distance less than the full distance of the body of cellular material a molding structure defining a plurality of spaced-apart laterally-disposed open areas, (iii) heating integral body to cause the cellular material to cure, and (iv) withdrawing the molding structure from said body of cellular material either before, during or after it is cured so as to leave intact an integral body of cellular material having a plurality of spaced-part individual portions of cellular material generally conforming in shape and pattern to the shape and pattern of the open areas of the molding member.

14. A process according to claim 13 wherein the molding structure is shaped to configure said plurality of spaced-apart individual portions of cellular material in the form of a honeycomb.

15. A process according to claim 13 wherein the molding structure is shaped to align said plurality of spaced apart individual portions of cellular material in a square pattern.

16. A process according to claim 13 wherein the molding structure is shaped to align said plurality of spaced-apart individual portions of cellular material in an offset pattern.

17. A process according to claim 13 wherein said cured polyimide foam is composed of a polyimide of at least one aromatic tetracarboxylic acid or derivative thereof and at least one aromatic or heterocyclic primary diamine.

18. A process according to claim 13 wherein said cured polyimide foam is composed of a polyimide of benzophenone tetracarboxylic acid or derivative thereof, 4,4'-methylenedianiline and at least one diaminopyridine.

19. A process according to claim 13 wherein said cured polyimide foam is composed of a polyimide produced from a lower alkyl ester of benzophenone tetracarboxylic acid, 4,4'-methylenedianiline and 2,6-diaminopyridine in a mole ratio of approximately 1:0.7:0.3, respectively.

20. A process according to claim 13 conducted such that said cellular material is recurable to a flexible, resilient foam having tensile strength properties similar to the tensile strength properties of the original cured polyimide foam subjected to the process.

21. A process according to claim 13 conducted such that the glass transition temperature of the original cured polyimide as determined by differential scanning calorimetry is reduced to a glass transition temperature falling within a predetermined range of glass transition temperatures for said original cured polyimide, and is thereupon discontinued.

22. A process according to claim 13 wherein said molding structure is removed from the cellular material before the cellular material is cured in (iii).

23. A process according to claim 13 wherein said molding structure is removed from the cellular material after the cellular material is cured in (iii).

24. A process according to claim 13 wherein said molding structure is removed from the cellular material during the curing of the cellular material in (iii).

25. A process according to claim 13 wherein said body of cured polyimide foam in (i) is a substantially rectangular body such that the body of cellular material in (ii), (iii), and (iv) is also substantially rectangular.

26. A process according to claim 25 further comprising applying after curing in (iii) a laminating material to the face of the unitary body of cellular material on the side opposite the face in which the molding structure was impressed.

27. A process according to claim 26 wherein the laminating material is in tape or sheet form with adhesive on both sides.

28. An integral body of cured polyimide foam having a plurality of spaced-apart laterally-proximate individual portions integral with and extending from a continuous portion thereof.

29. An article according to claim 28 wherein said individual portions are polygonal in cross section.

30. An article according to claim 28 wherein said individual portions are square or rectangular in cross section.

31. An article according to claim 28 wherein said individual portions are generally hexagonal in cross section.

32. An article according to claim 28 wherein said individual portions are generally circular in cross section.

33. A panel or tile comprised of a generally flat base portion of cured polyimide foam having a plurality of spaced-apart laterally-proximate individual portions of cured polyimide foam integral with and extending from said base portion.

34. An article according to claim 33 wherein said individual portions are polygonal in cross section.

35. An article according to claim 33 wherein said individual portions are square or rectangular in cross section.

36. An article according to claim 33 wherein said individual portions are generally hexagonal in cross section.

37. An article according to claim 33 wherein said individual portions are generally circular in cross section.

38. An article according to claim 33 wherein a laminate is affixed to said base portion on at least a portion of the side opposite the side from which said individual portions extend.

39. An article according to claim 38 wherein the laminate is a sheet or tape having adhesive on both sides.

* * * * *